Aug. 26, 1930.  H. C. THORNE  1,774,491
AUTOMATIC POWER SYSTEM
Original Filed Jan. 16, 1919   2 Sheets-Sheet 2
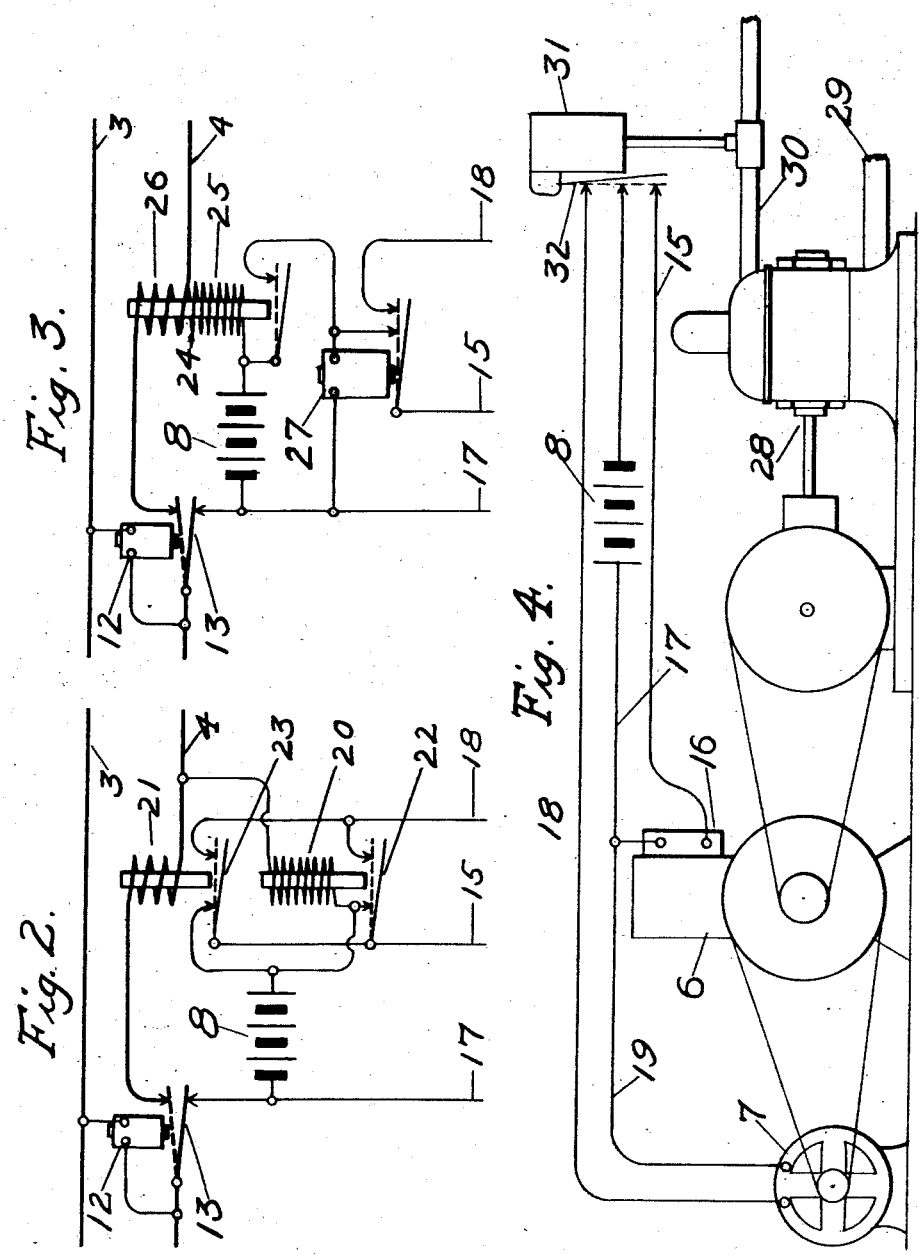
Inventor.
Harold C. Thorne Patented Aug. 26, 1930

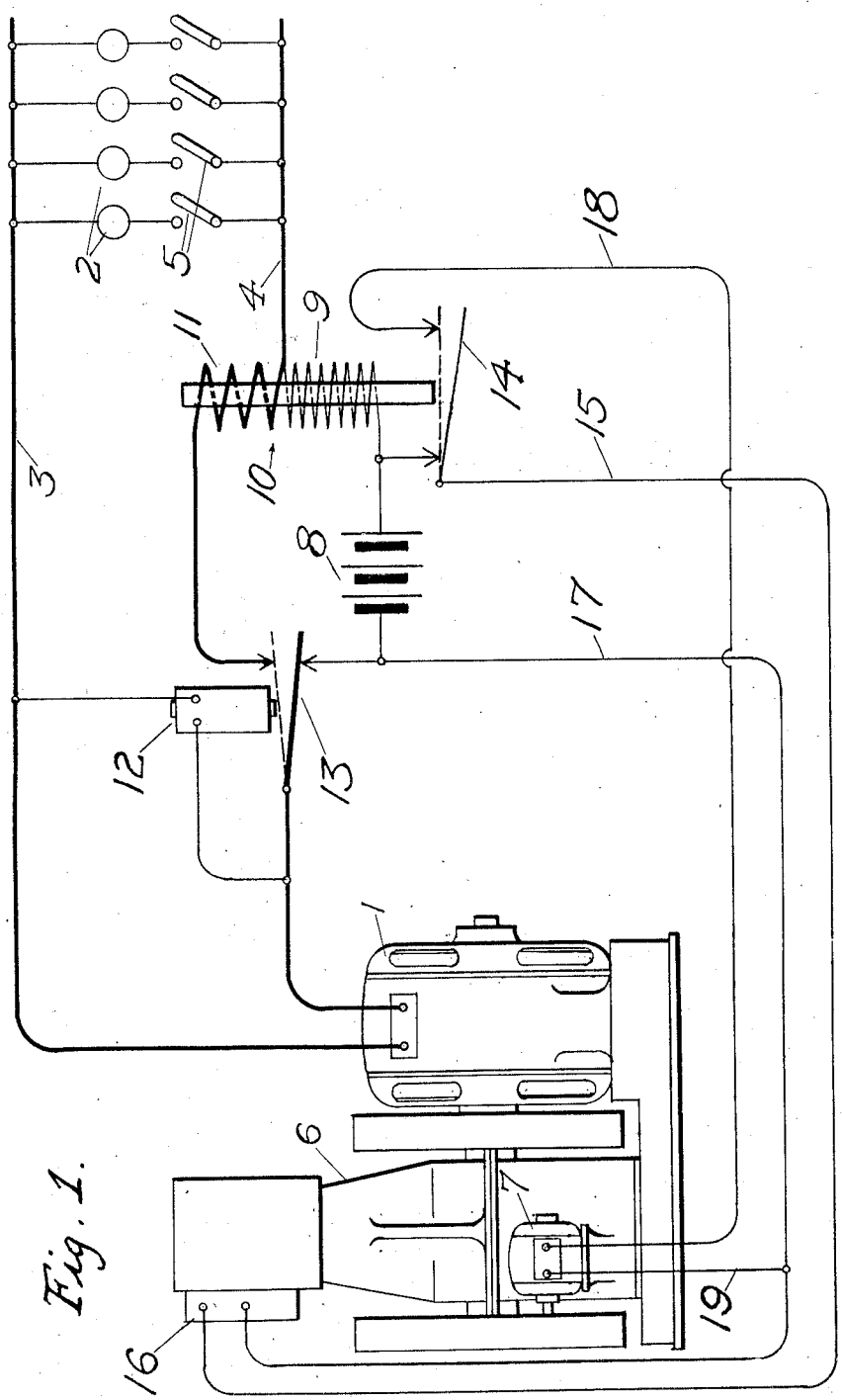

1,774,491

UNITED STATES PATENT OFFICE

HAROLD C. THORNE, OF DISTRICT OF COLUMBIA

AUTOMATIC POWER SYSTEM

Application filed January 16, 1919, Serial No. 271,432. Renewed December 16, 1929.

This invention relates to systems of electrical and power distribution and the object is to provide an automatically operated plant, in which it is only necessary to use a single low voltage storage battery of 3 or 4 cells of the type used in automobile gas-engine starters, and which will require little, or only occasional attention for the purpose of oiling, supplying gasoline and so forth.

An object of the invention is to provide a low voltage starting and charging system for the starting battery with the starting and charging system connected with an internal combustion engine in the usual way which in turn drives the main power generator (direct or alternating), or other power apparatus, indirect connection therewith, or by means of a belt or suitable clutches and mechanisms (subject matter of another application) in the system whereby when the external circuit of the main power generator is closed, or under certain conditions of the other power apparatus, the engine will be started automatically, and when the external circuit is again opened, or under certain changed conditions in the other power apparatus or power mains, the engine will stop, and the starting battery will be kept at proper charge in the same manner as in the ordinary electric starting systems for gas engines.

A further object is to provide an automatic power system in which the operating circuits are extremely simple and highly efficient.

In the accompanying drawings, Fig. 1 is a diagrammatic representation of the preferred embodiment of the invention; Figs. 2 and 3 are diagrams representing slight modifications, Fig. 4 is a diagrammatic representation of the invention applied to a water supply system or air compressing system.

In Fig. 1, the generator 1 for supplying current to the external load, represented at 2, through mains 3 and 4 when switches 5 are closed, may be either a direct or alternating current generator and coupled with an internal combustion engine 6 in any suitable manner. As shown in the diagram the generator is directly connected with the engine, however, it may be connected by means of a belt drive or through suitable clutches, speed regulators, etc.; various types of voltage regulators may also be employed; and the engine may be a multiple cylinder type, instead of single cylinder as shown; however, the type of dynamo, connections, etc. are not specifically a part of this particular invention.

An electric starting and charging unit 7 of any desired type—single or double unit with accessory connections—is illustrated as directly connected with the engine 6. A low voltage storage battery 8 is provided for operating the starter and it also provides current for operating the high resistance coils 9 of a relay 10 which operates to close the starter and charging unit circuit for starting the engine. A low resistance coil 11 of the relay 10 is connected so as to be in series with the generator 1 and external load and operates to maintain the circuits closed which were closed by the high resistance coil 9 when a relay 12 has been operated to change the connections in main 4. The relay 12 is connected directly with the generator 1 and operates to connect the main 4 through the coil 11 of relay 10 with the generator, and break the circuit through coil 9 while the generator is being driven.

The operation is as follows: Assuming the circuits to be as shown in full lines, the engine is at rest. Upon closing a switch 5, a circuit will be made from the battery 8, through the high resistance coil 9 of relay 10, main 4, switch 5, load 2, main 3, generator 1, armature 13 of relay 12, to the battery 8. Current flowing from battery 8 through coil 9 will attract the armature 14 of relay 10 to the dotted line position, thereby completing a circuit from battery 8 to armature 14, through conductor 15 to the ignition system 16 and through conductor 17 back to the battery 8; a circuit will also be made from battery 8 to armature 14 and conductor 18, to the starting and charging unit 7 and back through conductors 19 and 17 to battery 8. This will start the engine as is the case with the usual starting and charging units, and when the engine is running at the proper speed the starting and charging unit will recharge the battery 8. When the generator 1 is driven at sufficient speed (within 10% or 15% of its rated potential), the relay 12 will draw the armature 13 up and break the circuit through the high resistance relay coil 9 and make a circuit through the low resistance coil 11 so as to supply current from the generator to the external load. When the external circuit is again opened the relay 10 will be deenergized; armature 14 will fall, thus breaking the ignition circuit so as to stop the engine. Then relay 12 will be deenergized and armature 13 will assume its original position.

In Fig. 2, relays 20 and 21 take the place of relay 10 in Fig. 1. In this case relay 20 is a high resistance relay corresponding to the high resistance coil 9 of relay 10 in Fig. 1, and it acts only while the armature 13 is in its lower position; relay 21 is a low resistance relay and has the same function as coil 11 of relay 10; it operates only when armature 13 is in its upper position. Armatures 22 and 23 make the circuits in the same manner as armature 14 of relay 10. The circuits are otherwise the same as in Fig. 1.

In Fig. 3, a relay 24 with high and low resistance windings, 25 and 26, similar to relay 10, is used to close a circuit from battery 8 through a relay 27 which in turn makes the circuits from battery 8 through the ignition system and starting and charging unit as heretofore set forth.

In Fig. 4, the invention is shown applied to a pumping system. The starting and charging unit 7 is connected with the engine 6 by means of a belt, however, any suitable connection may be employed; the engine 6 in turn is belted or otherwise connected to a pump 28 having the usual supply and discharge pipes 29 and 30. The pump is adapted to discharge into a pneumatic tank (not shown) and is provided with a pressure responsive device 31 (the details of which are not shown) which acts upon a lever, armature or switch member, 32 which is adapted to close the circuits from battery 8 through conductor 15 and the ignition system 16, and through conductor 18 and the starting and charging unit 7 as before set forth. The operation of this system depends upon the pressure of the water in the pneumatic tank or pipe leading thereto which is a power main of the pumping system; the pressure responsive device 31 operates upon lever 32, when the pressure in the tank drops down to a predetermined point to close the circuits, start the engine and operate the pumup until the pressure in the tank rises to the point at which the pressure responsive device 31 is set to actuate the lever 32 in the opposite direction to break the circuits and stop the engine.

Having thus described my invention, I claim and desire to secure by Letters Patent:

1. An electric power system comprising the combination of an internal combustion engine having an electric starter and a dynamo connected therewith, an external load circuit for the dynamo, a circuit for the electric starter, an ignition circuit for the internal combustion engine, a battery in said dynamo external circuit adapted to furnish energy for said starter and ignition circuits, and a relay in the dynamo external circuit for connecting said battery with said ignition circuit and said starter circuit upon closing said dynamo external circuit and during the operation of the engine, said relay having an actuating coil operable by the battery and a holding coil which receives its energizing current from the dynamo and is effective only after the engine has started.

2. An electric power system comprising the combination of an internal combustion engine having an electric starter and a dynamo connected therewith, an external load circuit for the dynamo, a circuit for the electric starter, an ignition circuit for the internal combustion engine, a battery in said dynamo external circuit adapted to furnish energy for said starter and ignition circuits, a relay in the dynamo external circuit for connecting said battery with said ignition circuit and said starter circuit upon closing said dynamo external circuit, said relay having an actuating coil operable by the battery and a holding coil which receives its energizing current from the dynamo and is effective only after the engine has started, and a second relay operative to exclude the battery from said circuit through the actuating coil of the first said relay and the dynamo external load.

3. An automatic electric power system comprising a dynamo driven by an internal combustion engine and electric starting and charging means connected therewith, power mains for the dynamo, a battery for initially supplying current to said power mains and energy for starting the engine and the ignition thereof, a relay having an actuating coil connected in the circuit with said power mains and said battery adapted to connect the battery for starting the engine when a circuit is closed across the power mains, said relay having a holding coil effective only after the engine has started, and a second relay adapted to connect the dynamo through said holding coil with the power mains as long as the voltage of the dynamo is maintained above a predetermined value and said holding coil being adapted to maintain said connection as long as the circuit is closed across the power mains.

4. An automatic electric power system comprising a dynamo driven by an internal combustion engine and an electric starting and charging unit connected therewith, a relay having high and low resistance windings connected in one of the power supply mains from the dynamo, a storge battery for supplying current for energizing the high resistance winding of said relay when a circuit is closed across the power main from the dynamo also for the engine starting unit and ignition system, a second relay connected with said dynamo which operates to open the circuit through the high resistance winding of said first relay and close the circuit from the dynamo through the low resistance winding of said relay and the power mains.

5. An automatic power system comprising an internal combustion engine with an electric starting and charging unit and a driven power element connected therewith, a power supply main connected with said driven element, an actuating device connected with said power main, said actuating device having a single movable switch member, which member is actuated to simultaneously close and maintain closed the engine ignition system and starting unit circuits for starting the engine and is held in operative position for maintaining the circuits closed during the operation of the engine and is operated to open said circuits simultaneously for stopping the engine responsive to conditions in the power supply main.

6. An automatic power system comprising an internal combustion engine with an electric starting and charging unit and a driven power element connected therewith, a storage battery adapted to be connected with said starting unit and the engine ignition system for starting the engine, an actuating device connected with the power element and responsive to changes in the power system, said actuating device having a movable switch member which of itself affords a direct and simultaneous connection between said storage battery, igintion system and starting and charging unit, maintaining said connection during the operation of the engine and is operative to disconnect the battery, ignition system and starting and charging unit from each other to stop the engine.

7. In a system comprising a power driven element and an internal combustion engine for driving the same, an electric starting unit connected with said engine, an ignition system for the engine, and an actuating device responsive to variations in the system in direct connection with the power driven element for automatically closing and opening the circuit of the starting unit and simultaneously effecting the operation of the ignition system and the discontinuance thereof for starting and stopping the engine.

8. The combination comprising an external power system, a power member for supplying energy to said system, and an internal combustion engine for driving said power member, for supplying the energy therefrom to the system, an ignition system and a starting device for the engine, a source of energy for supplying power to said starting device for starting the engine, a single actuating device connected with and responsive to the conditions in the external power system supplied by the driven power member connected therewith and adapted to simultaneously control the ignition system for the engine and the application of said source of energy for starting and stopping the engine.

9. In an automatic electric generating system, the combination of a work circuit, a high voltage generator adapted to supply energy to the work circuit, a fuel-operated engine for driving the generator, a low voltage battery, low voltage dynamo electric apparatus mechanically connected with the engine for starting the engine with energy from the battery and for charging the battery, means comprising a relay in the circuit of the high voltage generator having an actuating coil operated by the battery for controlling the starting of the engine by said apparatus and said battery upon the closure of the work circuit and having a holding coil ineffective during the starting of the engine which thereafter receives its energizing current from the generator for effecting connection between the apparatus and the battery during the operation of the engine, and means for disconnecting the battery from the actuating coil after the engine has started.

10. In an automatic electric generating system, the combination of a work circuit, a high voltage generator adapted to supply energy to the work circuit, a fuel-operated engine for driving the generator, an ignition system for said engine, a low voltage battery, low voltage dynamo electric apparatus mechanically connected with the engine for starting the engine with energy from the battery and for charging the battery, a relay having an actuating coil operated by the battery for controlling the starting of the engine and the ignition system thereof by said apparatus and said battery upon the closure of the work circuit and provided with a holding coil ineffective during the starting of the engine which thereafter receives its energizing current from the generator for effecting connection between the apparatus and the battery during the operation of the engine, and means to disconnect the battery from the actuating coil and to connect the high voltage generator with the holding coil.

11. In the combination of a dynamo with a gas engine and electric starting and charging unit, a controlling relay therefor with high and low resistance actuating coils in the dynamo external circuit, a second relay connected with the dynamo terminals and adapted to disconnect the dynamo external circuit through the high resistance coil of said relay.

12. An automatic electric power system comprising a dynamo with a prime mover and electric starting and charging means connected therewith, a relay having an actuating winding and a holding winding in the external circuit of the dynamo for controlling said starting and charging means, and means operative to disconnect the dynamo external circuit through the actuating winding of said relay and to connect it through the holding winding thereof.

13. The combination with a dynamo, an external power translating device circuit therefor, an internal combustion engine for driving the dynamo and an electric starting and charging system including a battery for starting the engine, of a controlling relay having high and low resistance windings for connection in the dynamo external circuit and operable by current from the battery through the high resistance winding to effect the starting of the engine by said system when there is a demand for current from the dynamo in the dynamo external circuit, and means operative to disconnect the dynamo external circuit through the high resistance winding of said relay and to connect said circuit with the dynamo through the low resistance winding of said relay only after the engine has started.

14. An electric power apparatus embodying a main circuit, an internal combustion engine, an electrical generator to be driven by the engine for supplying said circuit, an electric motor for starting the engine, a low voltage battery for supplying the motor, an ignition circuit for the engine including a normally open switch, a second switch normally connecting the battery in the main circuit and movable to open the said battery circuit and connect the generator in the main circuit, a low voltage electromagnetic means in circuit with the second switch for closing the first named switch when the main circuit is closed and effecting a connection between the motor and battery by current flowing through the first-named switch at the time that the low voltage electromagnetic means is energized and the first named switch is closed, electromagnetic means in circuit with the generator for holding the first named switch closed by generator current only after the engine has started, and electromagnetic means in circuit with the generator controlling the second switch to open the connection between the battery and the main circuit thereby disconnecting the circuit through said low voltage electromagnetic means and connecting the generator in the main circuit through the last said electromagnetic means for energizing the same for holding said first named switch closed as long as a circuit is closed across the power mains.

15. In a water supply system comprising a pump and an internal combustion engine for driving the same, an electric starting unit connected with said engine, an ignition system for the engine, and an actuating device responsive to variations in the system in direct connection with the pump for automatically closing and opening the circuit of the starting unit and simultaneously effecting the operation of the ignition system and the discontinuance thereof for starting and stopping the engine.

16. The combination comprising a water supply system, a pump for supplying water to said system, and an internal combustion engine for driving said pump for supplying the water therefrom to the system, an ignition system and starting device for the engine, a source of energy for supplying power to said starting device for starting the engine, a single actuating device connected with and responsive to the conditions in the water system supplied by the pump connected therewith and adapted to simultaneously control the ignition system for the engine and the application of said source of energy for starting and stopping the engine.

17. A water supply system comprising an internal combustion engine with an electric starting and charging unit and a pump connected therewith, a water supply main connected to said pump, an actuating device connected with said water main, said actuating device having a single movable switch member, which member is actuated to simultaneously close and maintain closed the engine ignition system and starting unit circuits for starting the engine and is held in operative position for maintaining the circuits closed during the operation of the engine and is operated to open said circuits simultaneously for stopping the engine responsive to conditions in the water main.

HAROLD C. THORNE.